US010810502B2

(12) United States Patent
Pillai et al.

(10) Patent No.: US 10,810,502 B2
(45) Date of Patent: *Oct. 20, 2020

(54) COMPUTING ARCHITECTURE DEPLOYMENT CONFIGURATION RECOMMENDATION USING MACHINE LEARNING

(71) Applicant: SAP SE, Walldorf (DE)

(72) Inventors: Renjith Pillai, Bangalore (IN); Sujith Henamagalur Dinakar, Bangalore (IN); Arul Jegadish Francis, Sunnyvale, CA (US); Anish Nair, Saratoga, CA (US); John Mitchell, Dublin, CA (US)

(73) Assignee: SAP SE, Walldorf (DE)

( * ) Notice: Subject to any disclaimer, the term of this patent is extended or adjusted under 35 U.S.C. 154(b) by 381 days.

This patent is subject to a terminal disclaimer.

(21) Appl. No.: 15/829,717

(22) Filed: Dec. 1, 2017

(65) Prior Publication Data

US 2019/0171948 A1     Jun. 6, 2019

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC ............. G06F 11/3688; G06F 11/3672; G06F 11/3684; G06N 20/00; G06N 5/003
See application file for complete search history.

(56) References Cited

U.S. PATENT DOCUMENTS

| 10,042,636 | B1 * | 8/2018 | Srivastava | G06Q 10/06 |
| 2012/0203536 | A1 * | 8/2012 | Gangemi | G06F 9/455 703/22 |
| 2015/0379426 | A1 * | 12/2015 | Steele | G06N 20/00 706/12 |
| 2016/0269312 | A1 * | 9/2016 | Cavalcante | G06Q 10/0631 |
| 2016/0285966 | A1 * | 9/2016 | Brech | H04L 41/0893 |
| 2016/0314065 | A1 * | 10/2016 | Chirgwin | G06F 11/3672 |
| 2018/0046798 | A1 * | 2/2018 | Zeller | G06F 21/53 |
| 2018/0227201 | A1 * | 8/2018 | Krauss | H04L 43/0805 |
| 2019/0361799 | A1 * | 11/2019 | Wojciak | G06K 9/6218 |
| 2019/0384699 | A1 * | 12/2019 | Arbon | G06N 20/00 |

* cited by examiner

*Primary Examiner* — Matthew M Kim
*Assistant Examiner* — Indranil Chowdhury
(74) *Attorney, Agent, or Firm* — Jones Day (57) ABSTRACT

Data is received that characterizes a software system. Thereafter, using at least one machine learning model trained using historical testing data from a plurality of training software systems, a recommended computing architecture is generated for the software system. Data can then be provided that characterizes the software system. Related apparatus, systems, techniques and articles are also described.

19 Claims, 6 Drawing Sheets

COMPUTING ARCHITECTURE DEPLOYMENT CONFIGURATION RECOMMENDATION USING MACHINE LEARNING

TECHNICAL FIELD

The subject matter described herein is directed to the use of machine learning to recommend optimal computing architectures for software systems prior to their deployment.

BACKGROUND

Software systems are becoming increasingly distributed across multiple computing nodes including mobile devices, client computers, application servers, databases, and the like. The orchestration across these nodes also increases the complexity for testing and otherwise verifying that such systems operate as intended prior to deployment especially when containerization or other virtual machine systems are used. Further, it is also more increasingly difficult to define specify computing architecture that can optimally execute the software system given a predefined set of constraints.

SUMMARY

In one aspect, data is received or recorded that characterizes a software system behavior when run in a particular operating environments and specific configurations. Thereafter, a computing architecture is recommended for the software system using at least one machine learning model trained using that historical testing data from a plurality of training software systems. Thereafter, the model is provided that characterizes the software system which can be used when deploying the software system and/or to dynamically reconfigure the software system that has already been deployed so as to perform more optimally.

The providing of data can include at least one of causing the data to be displayed in an electronic visual display, transmitting the data to a remote computing device, loading the data into memory, or storing the data in electronic physical persistence.

The training software systems can be tested to identify faults with such training software systems. Changes to computing architectures for the training software systems in light of the identified performance faults can be recorded. In such implementations, the at least one machine learning model can be trained using both the identified performance faults and the recorded changes. The testing can include selectively altering resources available to one or more software programs forming part of the corresponding training software system according to a respective test plan or to various configurations and/or characteristics of the operating environment itself. In addition, performance of the respective training software system can be monitored, concurrent with the altering of the resources, to identify performance faults. Data can be provided that characterizes the performance faults. The selectively altered resources can include at least one of memory, I/O bandwidth, network, processor resources, or hardware capabilities. The test plan can specify a sequence of test events which cause the resources for specific software programs to be altered. Each test event can quantify an amount of variance for the corresponding altered resource. The test plan can specify a decision tree of test events in which each test event is triggered based on an occurrence of a pre-defined condition.

The at least one machine learning model can include at least one of: a neural network model, a logistic regression model, a support vector machine, a random forest, a nearest neighbor model, a Bayesian model, or a genetic algorithm.

The software system can comprise a plurality of software programs executing within a plurality of containers across multiple computing nodes.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter recommends optimal computing architectures for software systems that ensure that failures of such systems after deployment are reduced or even eliminated.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
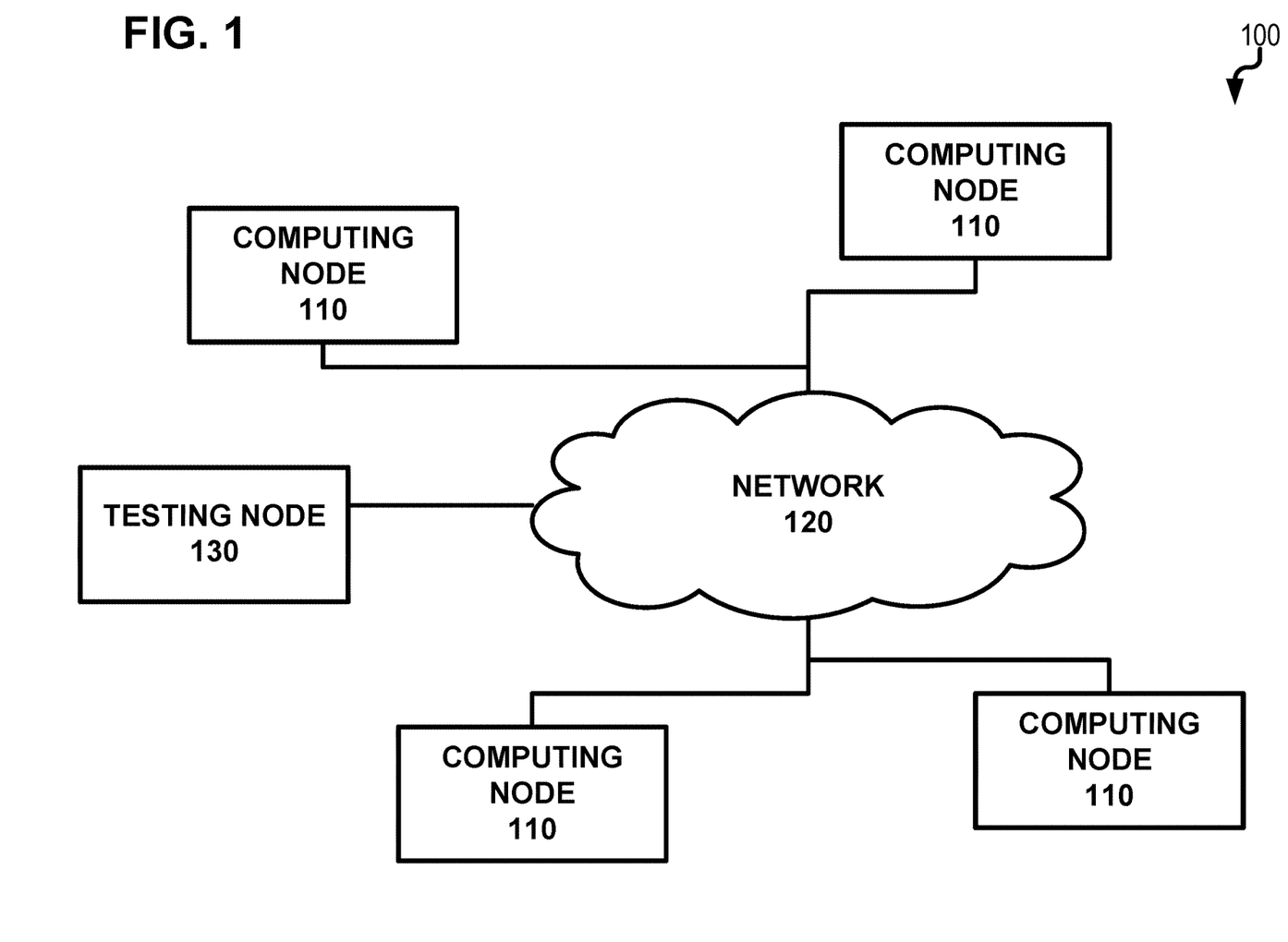
FIG. 1 is a process flow diagram illustrating a computing environment executing a software system across multiple computing nodes.

FIG. 1 is a diagram illustrating a computing environment 100 in which there are a plurality of computing nodes 110 that interact with each other over a network 120 or peer to peer or via other communication mechanisms to execute a software system comprising one or more software applications. The computing nodes 110 can be one or more of a mobile computing device (e.g., tablet computer, mobile phone, etc.), client computers (e.g., laptops, desktops, etc.) or servers (e.g., web servers, application servers, etc.) or data storage devices (e.g., cloud-computing data sources, databases, etc.). Further, each computing node 110 comprises memory and at least one data processor for executing instructions loaded into the memory. The computing environment 100 can additionally include a testing node 130 that, as will be described in further detail below, inject or otherwise orchestrate testing of a software system executing in the computing environment. It will be appreciated that other implementations can utilize multiple testing nodes 130. The testing node 130 can, in some variations, be a dedicated computing device executing testing software while, in other cases, the testing node 130 is used to execute the software system.

Figure 2:
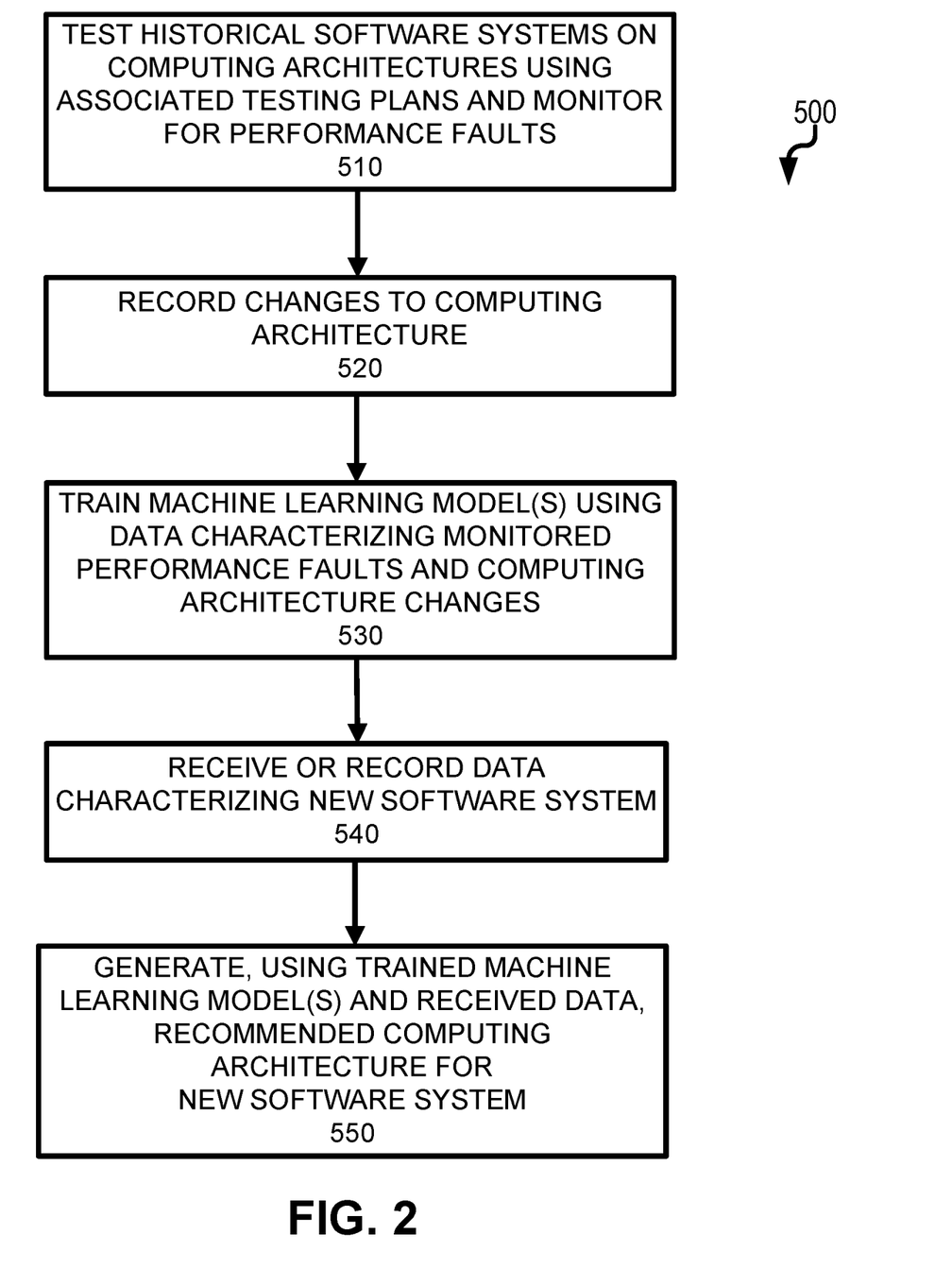
FIG. 2 is a diagram of one of the computing nodes of FIG. 1.

With reference to diagram 200 of FIG. 2, one or more of the computing nodes 110 can execute one or more containers 210 or otherwise provide operating system level virtualization. Containerization, in this regard, is an operating system feature in which the kernel allows the existence of multiple isolated user-space instances. Each container 210 can be used to execute one or more software programs 220 (which can form part of the software system). These software programs 220 can be selectively allocated resources of the associated computing node 110 within such container 210. These resources can, for example, be one or more of: memory 230, I/O bandwidth 232, network I/O 234, processor resources 236 (e.g., processor cores, etc.), hardware capabilities 238 (e.g., access to peripheral devices, etc.), and the like. Stated differently, the containers 210 can allow or deny access to such resources based on a variety of factors. Further, the containers 210 are only allocated a portion of such resources which are made available to the corresponding computing nodes 110. Each computing node 110 operating system can create several containers 210 to each of which a subset of the resources of the computing node 110 can be allocated. Each container 210 can contain any number of computer programs 220. These computer programs 220 may run concurrently or separately, even interact with each other.

While the examples described herein refer to containerization, it will be appreciated that the current subject matter can be directed to executables running directly on hardware as well as running inside virtualization such as jails, virtual machines and/or containers.

Figure 3:
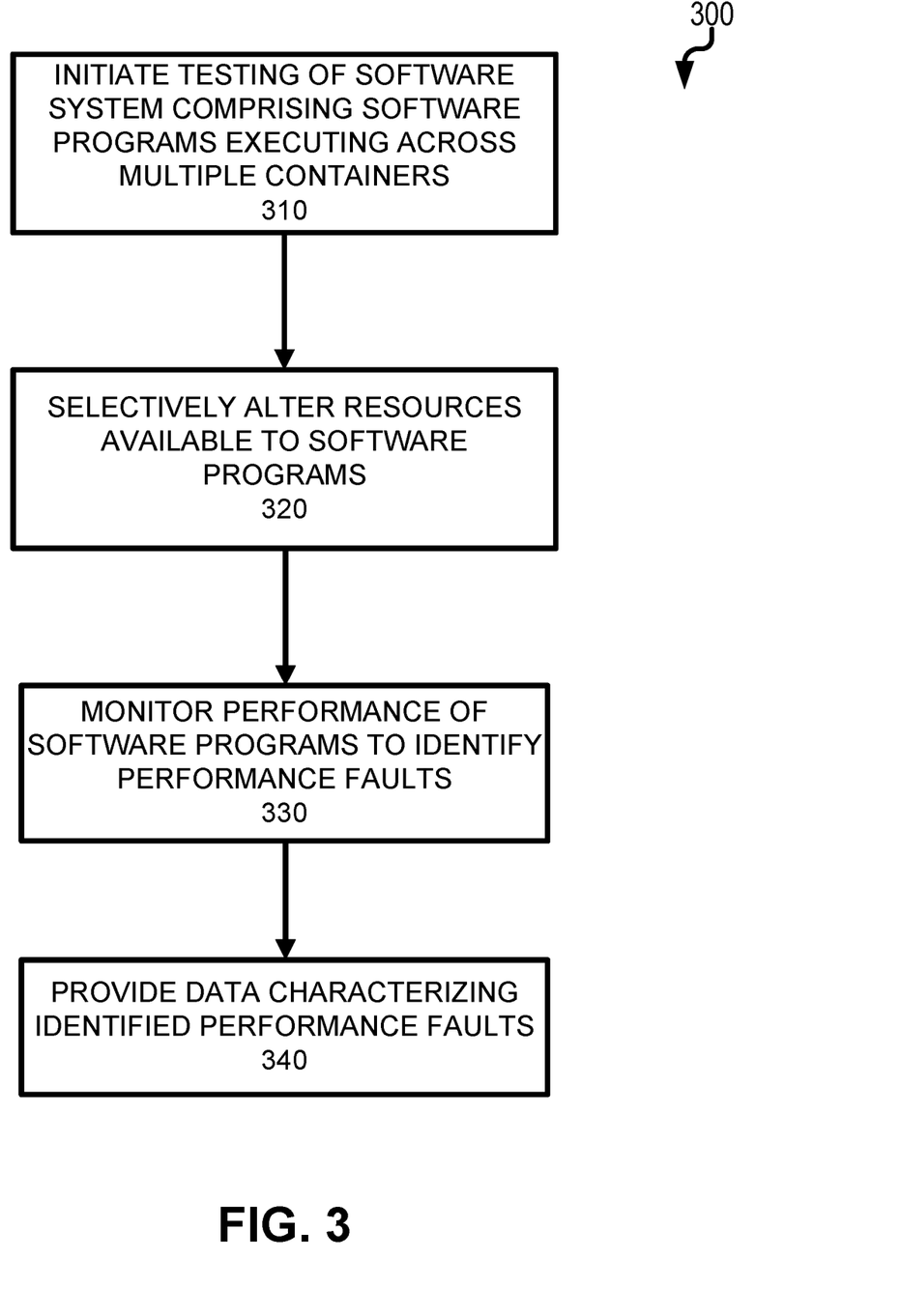
FIG. 3 is a process flow diagram illustrating testing of the software system of FIG. 1.

With reference to process flow diagram 300 of FIG. 3, at 310, execution of a software system is initiated. The software system includes a plurality of software programs executing within a plurality of containers across multiple computing nodes. During such execution, at 320, resources available to one or more of the software programs are selectively altered according to a test plan. Concurrent with the altering of the resources, at 330, performance of the software system is monitored to identify faults. Subsequently, at 340, data providing the performance faults are provided. Provided, in this regard, can include one or more of causing the data to be displayed in an electronic visual display, transmitting the data to a remote computing device, loading the data into memory, or storing the data in electronic physical persistence.

The software system testing can, in some variations, be performed in a development environment to characterize the software system while being developed or modified, and with additional capabilities and variations can be more aggressively and comprehensively tested in test environments prior to deployment into a production environment. In other variations, the software system testing as provided herein can be used to continually or periodically test the execution of the software system within the production environment. In either event, identified faults can be used by a developer to change or otherwise alter, for example, resources allocated to a container 210 or a software program 220 executing within one of the containers 210.

The test plan can take many variations. In some implementations, the test plan can specify test events to inject (via a testing node 130) into the computing environment. The test events can specify which resources for which software application 220 and/or container 220 are varied. The test plan can, in one variation, specify a sequence (including timing) for initiating the test events during execution of the software system. In other variations, the test plan can be a decision tree or other similar arrangement in which test events forming part of the test plan are triggered only when certain conditions are met.

The test events forming part of the test plan can quantify an amount of variance of allocated resources such as the memory 230, the I/O bandwidth 232, the network I/O 234, the processor resources 236, and the hardware capabilities 238. For example, the test plan can specify random packet dropping between two software applications 220 or containers 210 or computing nodes 110. As another example, the test events can specify failure of one or more of the containers 210/computing nodes 110 such as a data center, database, or cloud data source. In addition, the testing system can take into account information from e.g., application telemetry and logs to track the behavior of the software system and make testing decisions (e.g., steps or gates, or in measuring the system). Also, the testing system can inject itself in the middle of various functions to track and manipulate the system under test—for example, providing a communication proxy to simulate networks with different quality and performance characteristics or proxying a database driver to induce various timing and error conditions.

In some variations, the test plans can be generated using one or more machine learning models. With reference to diagram 400 of FIG. 4, at 410, a plurality of historical software systems are tested during model design-time using corresponding testing plans and the behavior and performance faults for such historical software systems are logged. Thereafter, at 420, information characterizing the logged historical behavior and performance faults are used to train at least one machine learning model.

Figure 4:
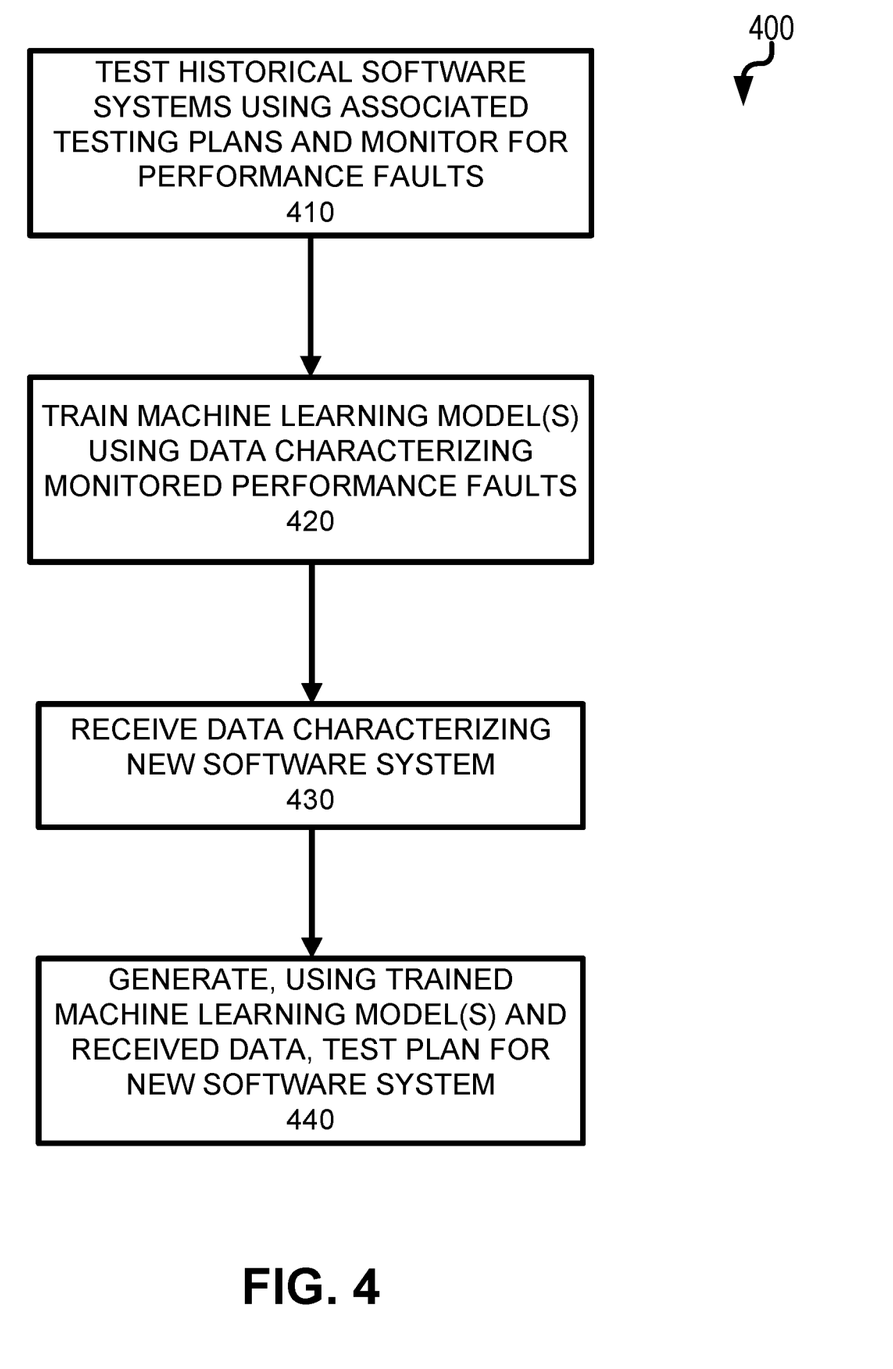
FIG. 4 is a process flow diagram illustrating generation of a test plan for testing the software system of FIG. 1 using machine learning.

In some implementations, baselines of the actual functional and performance characteristics are created to help generate/train the at least one machine learning model. The at least one machine learning model can subsequently be run with comprehensive calibration as to nominal/expect variances versus different degrees of violation. The machine learning model can take a variety of forms including, without limitation, a neural network model, a logistic regression model, a support vector machine, a random forest, a nearest neighbor model, a Bayesian model, a genetic algorithm, and/or the like. Once the at least one machine learning model is trained, during runtime and at 430, data characterizing a new software system is received. This received data is used by at least one trained machine learning model, at 440, to generate test plans that optimally characterizes operational faults associated with the software system.

Figure 5:
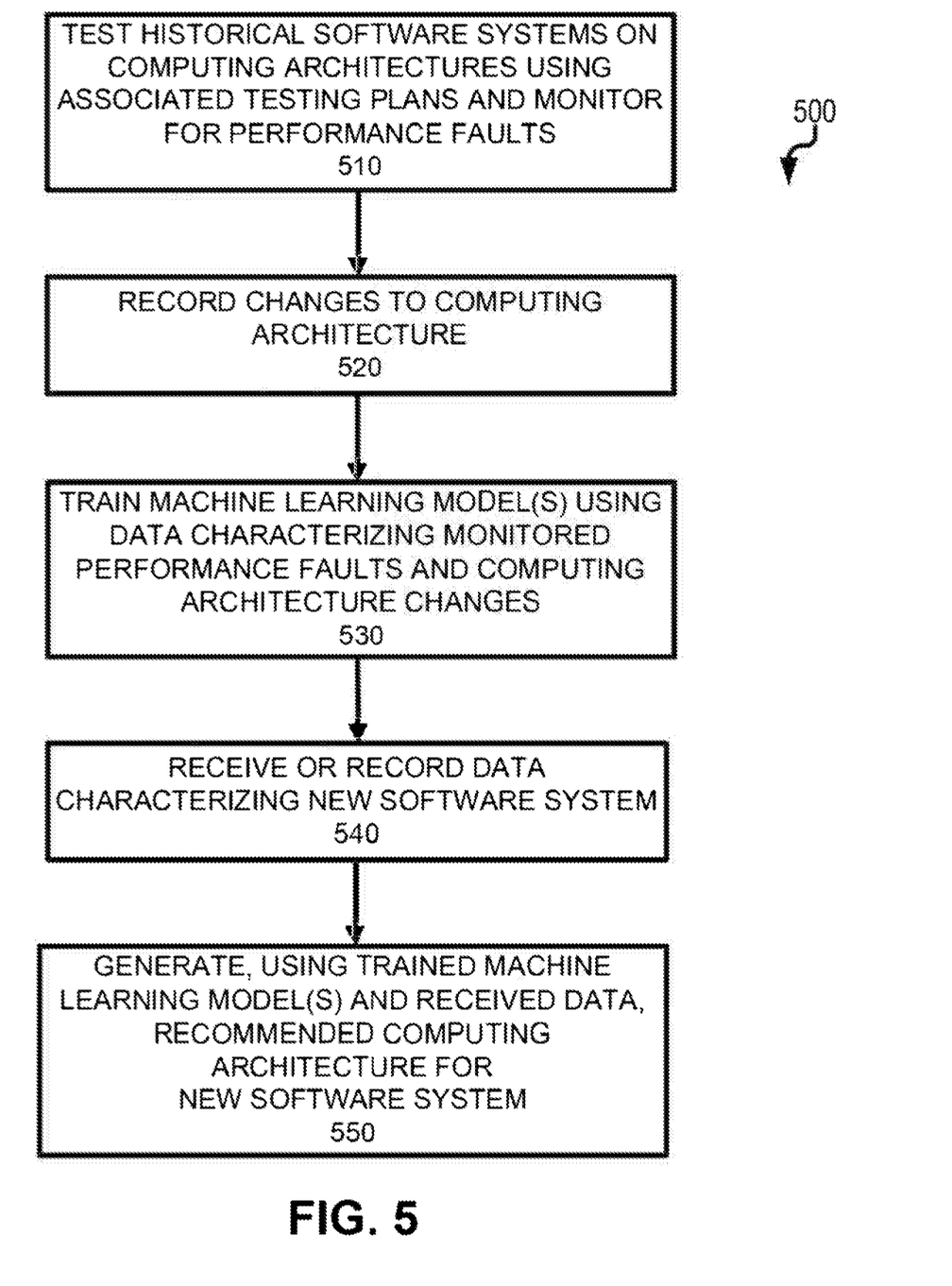
FIG. 5 is a process flow diagram illustrating generation of an optimal computing architecture for implementing a software system having similar functionality to that of the software system of FIG. 1.

In some variations, instead of or in addition to the generation of test plans, one or more machine learning models can be used to identify an optimal computing architecture to implement a particular software system (as opposed to a test plan which is used to characterize performance faults with the software system so that the resources allocated to aspects of the software system and/or the operating environment can be modified). With reference to diagram 500 of FIG. 5, at 510, a plurality of historical software systems executing on various computing architectures are tested during model design-time using corresponding testing plans and the faults for such historical software systems are logged. Thereafter, at 520, changes to the computing architectures of such historical software systems in light of the faults are recorded. Subsequently, at 530, both the information characterizing the logged historical faults as well as the recorded changes to the computing architectures are used to train at least one machine learning model. The machine learning model can take a variety of forms including, without limitation, a neural network model, a logistic regression model, a support vector machine, a random forest, a nearest neighbor model, a Bayesian model, a genetic algorithm, and/or the like. Once the at least one machine learning model is trained, during runtime and at 540, data characterizing a new software system is received. This received data is used by at least one trained machine learning model, at 550, to generate a recommended computing architecture that optimally executes the software system. In some cases, operational/resource constraints for the computing architecture can be taken into account by the at least one machine learning model when recommending the computing architecture.

The recommended computing architecture (including the machine learning models) of the software system and the operating environment can take into account various external cost functions. For example, the process of generating the computing architecture can take into account costs for cloud-based platforms in terms of processor resources, storage, bandwidth and variations as well as any other available internal resources (e.g., local data centers, etc.). Such cost functions can vary over time. Thus, the machine learning model(s) can take into account all of the various resource usages for the entire spectrum of the workload(s) of the software system (i.e., what are the resources needed to run the system during the quiet times, the peak times, and various levels in-between those extremes, etc.). The model(s) can take the cost functions and guide the mapping of what architecture is going to provide, for example, an optimal price to safely deliver the need level of capacity/performance for each type of deployment environment given the various characteristics and costs of each environment.

Additionally, the machine learning model(s) can be used to specify/generate rules for the triggering of when to dynamically grow/shrink/reallocate the resources to more/fewer/different types (of e.g., compute instance nodes). Such dynamic changes can take into account the dynamic changes in the cost functions.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 6:
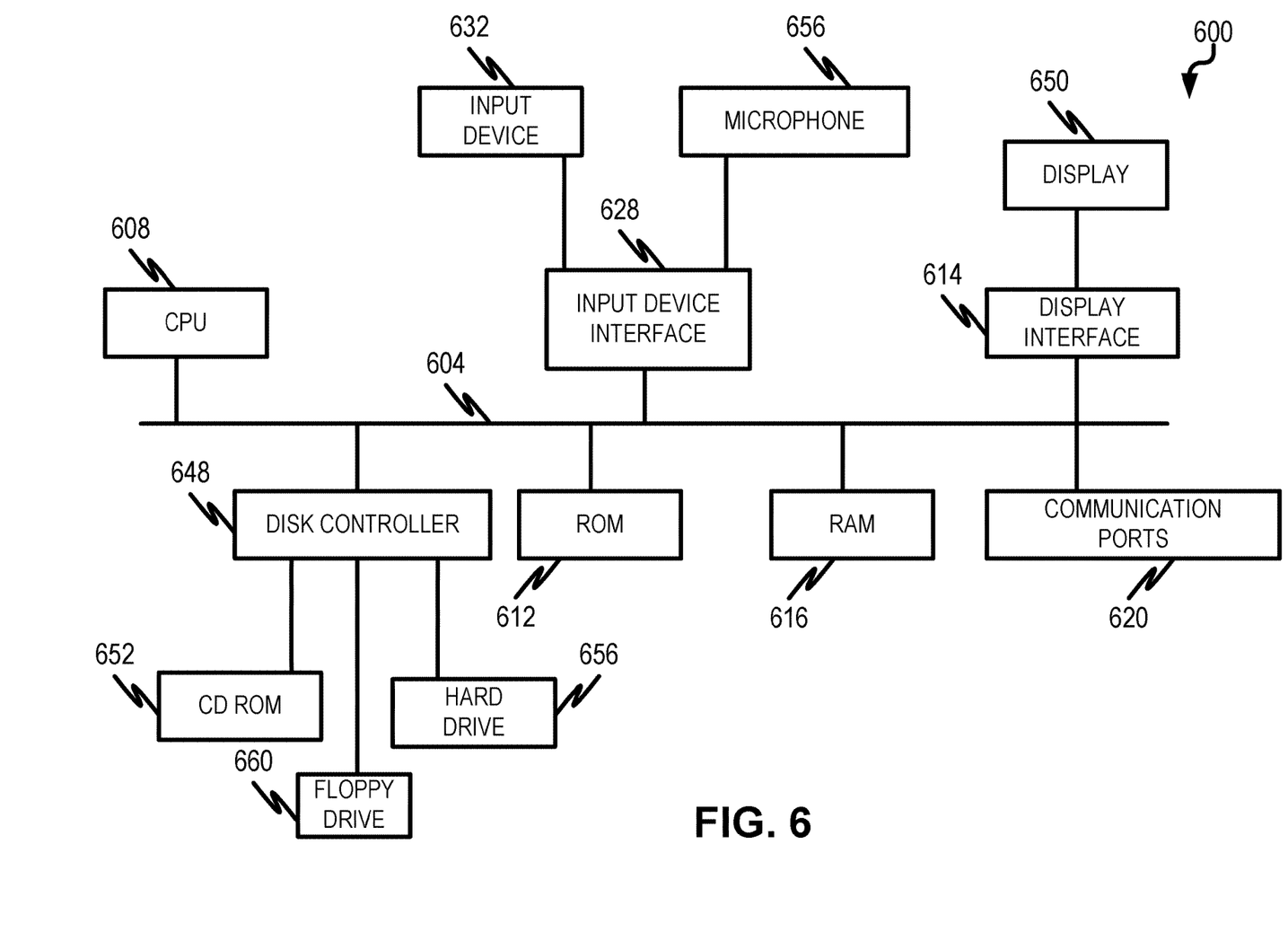
FIG. 6 is a diagram illustrating a computing device for implementing aspects described herein.

FIG. 6 is a diagram illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the communication port 620 includes or otherwise comprises a network interface.

To provide for interaction with a user, the subject matter described herein can be implemented on a computing device having a display device 650 (e.g., a CRT (cathode ray tube) or LCD (liquid crystal display) monitor) for displaying information obtained from the bus 604 to the user and an input device 632 such as keyboard and/or a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback by way of a microphone 656, or tactile feedback); and input from the user can be received in any form, including acoustic, speech, or tactile input. In the input device 632 and the microphone 656 can be coupled to and convey information via the bus 604 by way of an input device interface 628. Other computing devices, such as dedicated servers, can omit one or more of the display 650 and display interface 614, the input device 632, the microphone 656, and input device interface 628.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by at least one computing device comprising:
    receiving or recording data characterizing a software system executing in a computing environment;
    generating, using at least one machine learning model trained using historical testing data derived from testing of a plurality of training software systems according to pre-defined testing plans, a recommended computing architecture for the software system in light of one or more resource constraints of the computing environment; and
    providing data characterizing the recommended computing architecture for the software system;
    wherein:
        the training software systems are tested to identify performance faults with such training software systems by selectively altering resources available to one or more software programs forming part of the corresponding training software system or the computing environment according to a respective test plan and monitoring, concurrent with the altering of the resources, performance of the respective training software system to identify performance faults;
        changes to computing architectures for the training software systems are recorded in light of the identified performance faults;
        the at least one machine learning model is trained using both the identified performance faults and the recorded changes;
        the at least one machine learning model comprises at least one of: a neural network model, a logistic regression model, a support vector machine, a random forest, a nearest neighbor model, a Bayesian model, or a genetic algorithm.

2. The method of claim 1, wherein the providing of data comprising at least one of: causing the data to be displayed in an electronic visual display, transmitting the data to a remote computing device, loading the data into memory, or storing the data in electronic physical persistence.

3. The method of claim 1, wherein the selectively altered resources comprise at least one of: memory, I/O bandwidth, network, processor resources, or hardware capabilities or other configurations or aspects of the computing environment.

4. The method of claim 1, wherein the test plan specifies a sequence of test events which cause the resources for specific software programs to be altered.

5. The method of claim 4, wherein each test event quantifies an amount of variance for the corresponding altered resource.

6. The method of claim 1, wherein the test plan specifies a decision tree of test events in which each test event is triggered based on an occurrence of a pre-defined condition.

7. The method of claim 1, wherein the software system comprises a plurality of software programs executing within a plurality of containers across multiple computing nodes.

8. A system comprising:
    at least one data processor; and
    memory storing instructions which, when executed by the at least one data processor, perform operations comprising:
        receiving or recording data characterizing a software system executing in a computing environment;
        generating, using at least one machine learning model trained using historical testing data derived from testing of a plurality of training software systems according to pre-defined testing plans, a recommended computing architecture for the software system in light of one or more resource constraints of the computing environment; and providing data characterizing the recommended computing architecture for the software system;

wherein:
the training software systems are tested to identify performance faults with such training software systems by selectively altering resources available to one or more software programs forming part of the corresponding training software system or the computing environment according to a respective test plan and monitoring, concurrent with the altering of the resources, performance of the respective training software system to identify performance faults;

changes to computing architectures for the training software systems are recorded in light of the identified performance faults;

the at least one machine learning model is trained using both the identified performance faults and the recorded changes;

the at least one machine learning model comprises at least one of: a neural network model, a logistic regression model, a support vector machine, a random forest, a nearest neighbor model, a Bayesian model, or a genetic algorithm.

9. The system of claim 8, wherein the providing of data comprising at least one of: causing the data to be displayed in an electronic visual display, transmitting the data to a remote computing device, loading the data into memory, or storing the data in electronic physical persistence.

10. The system of claim 8, wherein the selectively altered resources comprise at least one of: memory, I/O bandwidth, network, processor resources, or hardware capabilities or other configurations or aspects of the computing environment.

11. The system of claim 8, wherein the test plan specifies a sequence of test events which cause the resources for specific software programs to be altered.

12. The system of claim 11, wherein each test event quantifies an amount of variance for the corresponding altered resource.

13. The system of claim 8, wherein the test plan specifies a decision tree of test events in which each test event is triggered based on an occurrence of a pre-defined condition.

14. A non-transitory computer program product storing instructions which, when executed by at least one data processor forming part of at least one computing device, perform operations comprising:

receiving or recording data characterizing a software system executing in a computing environment;

generating, using at least one machine learning model trained using historical testing data derived from testing of a plurality of training software systems according to pre-defined testing plans, a recommended computing architecture for the software system in light of one or more resource constraints of the computing environment; and providing data characterizing the recommended computing architecture for the software system;

wherein:
the training software systems are tested to identify performance faults with such training software systems by selectively altering resources available to one or more software programs forming part of the corresponding training software system or the computing environment according to a respective test plan and monitoring, concurrent with the altering of the resources, performance of the respective training software system to identify performance faults;

changes to computing architectures for the training software systems are recorded in light of the identified performance faults;

the at least one machine learning model is trained using both the identified performance faults and the recorded changes;

the at least one machine learning model comprises at least one of: a neural network model, a logistic regression model, a support vector machine, a random forest, a nearest neighbor model, a Bayesian model, or a genetic algorithm.

15. The non-transitory computer program product of claim 14, wherein the providing of data comprising at least one of: causing the data to be displayed in an electronic visual display, transmitting the data to a remote computing device, loading the data into memory, or storing the data in electronic physical persistence.

16. The non-transitory computer program product of claim 14, wherein the selectively altered resources comprise at least one of: memory, I/O bandwidth, network, processor resources, or hardware capabilities or other configurations or aspects of the computing environment.

17. The non-transitory computer program product of claim 14, wherein the test plan specifies a sequence of test events which cause the resources for specific software programs to be altered.

18. The non-transitory computer program product of claim 17, wherein each test event quantifies an amount of variance for the corresponding altered resource.

19. The non-transitory computer program product of claim 14, wherein the test plan specifies a decision tree of test events in which each test event is triggered based on an occurrence of a pre-defined condition.

\* \* \* \* \*